United States Patent [19]

Gruenbacher

[11] Patent Number: 5,298,267
[45] Date of Patent: Mar. 29, 1994

[54] COFFEE FILTER PACK

[75] Inventor: Dana P. Gruenbacher, Fairfield, Ohio

[73] Assignee: The Procter & Gamble Company, Cincinnati, Ohio

[21] Appl. No.: 907,761

[22] Filed: Jun. 30, 1992

Related U.S. Application Data

[63] Continuation-in-part of Ser. No. 726,429, Jul. 5, 1991, abandoned.

[51] Int. Cl.$^5$ .................. A47G 19/16; A47J 31/00; B65D 85/00
[52] U.S. Cl. ................................ 426/77; 99/295; 99/306; 426/111; 426/433; 206/0.5
[58] Field of Search .................. 99/295, 304, 306; 426/433, 77-84, 111; 206/0.5

[56] References Cited

U.S. PATENT DOCUMENTS

| | | | |
|---|---|---|---|
| 1,083,900 | 1/1914 | Brown . | |
| 1,370,782 | 3/1921 | Calkin . | |
| 1,412,388 | 4/1922 | Clermont . | |
| 1,454,739 | 5/1923 | Holland . | |
| 1,499,281 | 6/1924 | Altieri . | |
| 2,047,134 | 7/1936 | Coleman | 53/3 |
| 2,475,241 | 7/1949 | Hermanson | 206/0.5 |
| 2,926,088 | 2/1960 | Spiselman . | |
| 2,948,618 | 8/1960 | Saint . | |
| 3,083,100 | 3/1963 | Baran | 99/295 |
| 3,083,101 | 3/1963 | Noury . | |
| 3,344,734 | 10/1967 | Aguirre-Batres et al. | 99/304 |
| 3,347,151 | 10/1967 | Ronalds | 99/295 |
| 3,389,650 | 6/1968 | Michielsen | 99/295 |
| 3,411,431 | 11/1968 | Moerlini et al. | 99/304 |
| 3,695,168 | 10/1972 | VanBrunt | 99/306 |
| 3,971,305 | 7/1976 | Daswick | 99/295 |
| 4,027,582 | 6/1977 | O'Connell | 99/306 |
| 4,069,751 | 1/1978 | Gronwick et al. | 99/306 |
| 4,174,659 | 11/1979 | Pugliese et al. | 99/306 |
| 4,342,314 | 8/1982 | Radel et al. | 128/287 |
| 4,487,114 | 12/1984 | Abdenour | 99/295 |
| 4,520,716 | 6/1985 | Hayes | 99/306 |
| 4,695,422 | 9/1987 | Curro et al. | 246/504 |
| 4,800,089 | 1/1989 | Scott | 426/78 |
| 4,839,076 | 6/1989 | Willman et al. | 252/90 |
| 4,921,712 | 5/1990 | Malmquist | 426/77 |
| 4,983,410 | 1/1991 | Dinos | 426/77 |
| 5,012,629 | 5/1991 | Rehman et al. . | |
| 5,028,328 | 7/1991 | Long | 210/477 |
| 5,082,676 | 1/1992 | Love et al. | 426/79 |

FOREIGN PATENT DOCUMENTS

| | | | |
|---|---|---|---|
| 1325426 | 6/1962 | France | 426/433 |
| 1347892 | 11/1962 | France | 99/306 |
| 604802 | 5/1960 | Italy | 99/295 |
| 899055 | 6/1962 | United Kingdom . | |
| 1427375 | 3/1976 | United Kingdom . | |
| 2156662 | 10/1985 | United Kingdom . | |
| 2183459 | 6/1987 | United Kingdom . | |

*Primary Examiner*—Steven Weinstein
*Attorney, Agent, or Firm*—Dean L. Garner

[57] ABSTRACT

A conformable, self-aligning, high extraction efficiency coffee filter pack capable of flavor extraction efficiencies comparable to those obtained using an identical quantity of bulk coffee and a paper filter under identical brewing conditions, but which exhibits substantially consistent pot-to-pot brew strength for any given automatic drip coffee maker. The preferred filter pack is formed from two layers of flexible material which are secured to one another about their outermost periphery with a predetermined quantity of roast and ground coffee housed within a brew chamber formed between the two layers. The brew chamber exhibits a maximum volume between about 25 percent and about 300 percent greater than the volume of the dry roast and ground coffee contained therein. The discharge flow rate from the brew chamber is slower than the inlet flow rate into the brew chamber to permit a buildup of water and flooding of the brew chamber. The flexible conformable sidewall surrounding the brew chamber extends upwardly a vertical distance which is at least sufficient to capture enough hot water to totally immerse the brew chamber when the brew chamber is in its fully expanded condition. This causes the roast and ground coffee within the chamber to expand and float throughout the remaining portions of the brew cycle, thereby establishing a steady state brewing condition which is highly effective in maximizing coffee/water contact as the hot water passes through the brew chamber on its way to the pot.

8 Claims, 6 Drawing Sheets

COFFEE FILTER PACK

CROSS-REFERENCE TO RELATED APPLICATION

This is a continuation in part of application Ser. No. 07/726,429, filed Jul. 5, 1991, now abandoned.

FIELD OF THE INVENTION

This invention relates to low cost, high efficiency, disposable coffee filter packs to be used with most commercial drip coffee makers.

BACKGROUND OF THE INVENTION

A typical coffee brew machine comprises a base member with a heater element used to support a glass coffee pot and a coffee filter holder attached to the base in the position above the coffee pot. The coffee filter holder is typically frusto-conical in shape with one or more central apertures through the bottom wall and is designed to receive a disposable coffee filter. The coffee filter is normally fabricated from porous paper and is also frusto-conical in shape so as to be received within the coffee filter holder. In use, the coffee filter will be placed in the coffee filter holder and a measured amount of roast and ground coffee is placed in the bottom portion of the coffee filter. A measured quantity of hot water is then directed into the interior of the coffee filter onto the ground coffee. As the water passes through, the coffee expands and floats up in the filter increasing the coffee/water contact area. The water will then percolate through the ground coffee and flow through the bottom and lower side portions of the porous coffee filter and through the coffee filter holder apertures down into the coffee pot.

One disadvantage with the aforementioned system is that the ground coffee must be individually measured into the coffee filter each time a pot of coffee is to be brewed. This is time consuming and may result in too much or too little coffee being placed in the filter. If the amount of coffee placed in the filter varies to any significant extent, then the brew strength of the resultant coffee will also vary. Another disadvantage is that separate receptacles must be provided for the individual coffee filters and the ground coffee. Lastly, when measuring the coffee into the coffee filter or disposing of a used filter, the coffee is often spilled onto the counter area or the floor resulting in waste of coffee and a waste of time in cleaning up.

Coffee manufacturers have substantially eliminated the pot-to-pot brew strength inconsistencies arising from poor measurement of coffee by the operator by providing unitized pouches, each containing a predetermined volume of roast and ground coffee suitable for brewing a single pot of coffee of reasonably consistent strength from one pot to the next. However, these unitized pouches add to cost and disposal problems due to the need for additional packaging equipment and material. In addition, they do not eliminate the messiness problems normally associated with bulk coffee/paper filter systems, since loose grounds and filters must still be disposed of.

Recently, coffee filter packs have been designed in an attempt to overcome some disadvantages from this method. Most of these coffee filter packs are made with heat sealable filter paper or from non-woven polyester, polypropylene, polyethylene or a combination thereof. These materials are typically more expensive than conventional filter paper, which is typically comprised almost entirely of wood fiber. Moreover, these filter packs are usually circular or square in shape and simply cover the bottom wall of the coffee filter holder. One example of such a filter pack is disclosed in U.S. Pat. No. 5,012,629 issued to Rehman on May 7, 1991. These filter packs are often improperly positioned in the coffee filter holder resulting in inconsistent brew strength from pot-to-pot, since their shape and materials of construction allow water to escape around the sides and through the coffee filter pack without sufficient exposure to all of the coffee contacted in the brew chamber of the filter pack. This results in poor coffee extraction. Furthermore, the coffee will often migrate to one side of the filter pack so that much of the water which does pass through the brew chamber of the filter pack does not contact any coffee. As a result, these filter packs produce brewed coffee with a relatively low level of extracted flavor solids as well as an inconsistent brew strength from pot-to-pot.

U.K. Patent Application GB 2,183,459 discloses yet another coffee filter pack having a pre-measured amount of ground coffee within a receptacle region or brew chamber. The receptacle region is defined by a pair of frusto-conical layers of porous filter paper mutually adhered to one another to form a substantially vertically extending sidewall. However, since the sidewall is constructed of initially porous paper material and there is no teaching of any need to render the sidewall substantially impervious to water to force all of the incoming water through the receptacle containing the ground coffee, it is believed that the filter pack disclosed in U.K. Patent Application GB 2,183,459 would not deliver any improvement in pot-to-pot brew strength consistency over the structure disclosed by Rehman.

Still other workers in the prior art have made a multi-component coffee filter pack having a frusto conical shaped side wall comprised of a rigid plastic material while the bottom portion of the pack comprises a coffee containing pouch which is made of porous material. The impermeable plastic side walls of the latter filter packs prevent water from escaping through the side walls and around the coffee containing porous pouch, thereby increasing at least the potential for coffee/water contact. Examples of devices using this concept are shown in U.K. Patent Application 2,156,662 and U.K. Patent 1,427,375. However, coffee filter packs of the latter type require careful and consistent placement on the coffee maker due to their rigid side walls and are generally quite expensive relative to the bulk coffee/filter paper systems they are intended to replace. Furthermore, some of these filter packs require that a new and expensive filter holder be attached to the coffee maker to permit their use.

Experience to date has been that filter packs of the prior art do much to overcome the messiness of the bulk coffee/filter paper systems they have replaced. Unfortunately, they have typically exhibited lower extraction efficiencies than the bulk coffee/filter paper systems. In addition they have typically introduced much worse pot-to-pot brew strength variation than bulk coffee systems using premeasured unitized pouches of roast and ground coffee in conjunction with paper filters. It is believed that these shortcomings of prior art coffee filter packs are due to a failure of prior art filter pack workers to recognize the importance of meeting certain previously undefined brewing parameters, which have for the first time been identified by applicants. For example, none of the foregoing references teach the importance of controlling the flow rates of liquids into and out of the brew chamber. By way of contrast, Applicant has learned that in order to minimize brew time, maximize flavor solids extraction and make a good pot of coffee, a substantial portion of the hot water directed into the filter pack must contact the coffee in the brew chamber after a substantially steady state brewing condition has been established within the brew chamber, i.e., after the brew chamber has been completely flooded with the incoming hot water so that the chamber expands to its maximum volume and allows substantially all of the coffee contained therein to loosely float within the chamber. Applicant has further learned that this is preferably done by providing a substantially water impermeable side wall having a height which is sufficient to retain at least enough water to permit complete immersion of the brew chamber when the brew chamber is in its fully expanded condition in combination with inlet and discharge flow rates into and out of the brew chamber that will cause the water to build up and puddle the coffee inside the brew chamber. If the water is not allowed to build up inside the brew chamber, as is typically the case with prior art filter packs, or if the coffee contained in the brew chamber of a prior art filter pack has shifted to one side of the brew chamber when the prior art filter pack is placed in the filter holder, the failure to properly control the inlet and outlet flow rates and the failure to provide a substantially water impermeable side wall having a height which is sufficient to retain at least enough water to completely immerse the brew chamber when the brew chamber is in its fully expanded condition will allow much of the water to flow directly through the brew chamber of the prior art filter pack without ever contacting any of the coffee.

In addition, applicants have learned that the brew chamber must be large enough to allow the roast and ground coffee room to expand and float while water is building up in the brew chamber in order to achieve sufficient coffee/water contact, i.e., to achieve a steady state brewing condition. This helps to prevent channeling of the water through the filter pack without sufficient coffee/water contact. Minimizing channeling is important, since channeling of the hot water directly through the brew chamber without sufficient coffee contact results in poor and inconsistent coffee flavor solids extraction.

It is therefore an object of the present invention to provide a coffee filter pack which overcomes many of the problems associated with the prior art brewing systems which employ bulk coffee and discrete paper filters, which approximates the extraction efficiency of systems employing bulk coffee and discrete paper filters, which provides reasonably consistent pot-to-pot brew strength without the need for premeasured unitized pouches of roast and ground coffee and which avoids the pot-to-pot brew strength inconsistency typically associated with prior art filter packs.

It is another object of the present invention to provide such a coffee filter pack which is relatively insensitive to operator placement within the filter holder of the coffee machine, which includes a substantially impermeable vertically oriented, conformable side wall, which is made almost entirely of relatively inexpensive flexible material, such as ordinary filter paper, and which can be used with a wide range of existing coffee filter holders without any need to modify them.

SUMMARY OF THE INVENTION

The present invention achieves the desired results by providing a coffee filter pack of a generally frusto-conical shape, made of inexpensive flexible material, but having a substantially vertically extending conformable side wall which is substantially impermeable to water. In order for the hot brewing water to be in highly effective contact with the predetermined amount of coffee contained in the brew chamber as it passes therethrough, the brew chamber is constructed so that the flow rate of liquid into the brew chamber is greater than the flow rate of liquid out of the brew chamber. Furthermore the filter pack is preferably constructed so that the flow rate at which the coffee maker delivers the hot brewing water to the filter pack is equal to or less than the rate at which water passes into the brew chamber and greater than the rate at which brewed coffee flows out of the brew chamber.

The substantially water impermeable vertically extending continuous side wall of coffee filter packs of the present invention is comprised of flexible material so that it can automatically conform to the porous filter support means in the coffee maker regardless of how much care is exercised by the operator in placing the filter pack in the filter support means. The substantially water impermeable side wall must be high enough after placement of the filter pack in the filter support means to capture enough of the incoming hot brewing water so that a substantially steady state brewing condition is established within the brew chamber relatively early in the brewing cycle, i.e., a flooded condition in which the brew chamber has been expanded to substantially its maximum volume by the incoming hot water. In addition, the brew chamber of the filter pack must be large enough to allow the coffee to expand and loosely float within the flooded chamber in order to establish a substantially steady state brewing condition within the brew chamber. This means that the substantially water impermeable side wall of the filter pack must extend upwardly a vertical distance which is at least equal to the maximum vertical height which can be assumed the brew chamber in a fully flooded condition. Otherwise flooding of the brew chamber will not take place.

The higher the substantially water impermeable side wall extends above this minimum, the greater will be the filter pack's insensitivity to careless placement within the filter support means, since lack of perfect concentricity with the filter support means will not result in an inability to retain enough hot water to establish a flooded steady state brewing condition within the brew chamber.

As a practical matter, the vertical height of the substantially water impermeable side wall is greater than the foregoing minimum to prevent overflow of the incoming hot water from the coffee maker (recall that the discharge flow rate of brewed coffee from the brew chamber is normally less than the incoming flow rate of hot water to the filter pack to permit flooding of the brew chamber).

The maximum height of the substantially water impermeable side wall is, of course, limited by the vertical height of the filter support means used on the coffee makers which are to employ the filter packs in question. If the filter pack extends vertically beyond the uppermost edge of the filter support means, it is likely to cause interference when attaching the filter support means to the coffee maker.

A particularly preferred embodiment of the present invention uses two layers of inexpensive porous filter paper secured to one another about their perimeters with a hydrophobic adhesive coating. The adhesive coating can serve two purposes. First, it can act as an adhesive for bonding one layer of filter paper to the other in order to contain the coffee within a region, which is referred to herein as a brew chamber. Second, it can direct the brewing water through the mass of coffee by making the substantially vertically extending conformable side walls and a portion of the bottom of the brew chamber substantially impermeable to water. The maximum volume of the brew chamber formed between the unsecured portions of the two layers of filter paper is preferably between about 25 percent and about 300 percent greater than the volume of the dry roast and ground coffee contained therein to allow the coffee to expand and float within the chamber during steady state brewing conditions.

A hydrophobic adhesive which allows the use of relatively inexpensive non-heat sealable filter mediums, such as paper, mediums, is preferably employed to construct preferred embodiments of the present invention. This hydrophobic adhesive is preferably applied everywhere on the bottom layer of filter medium, except in a portion of the area coinciding with the brew chamber, where the flow of brewed coffee is desired. This, in essence, creates a funnel which not only permits flooding of the brew chamber with water, but which also directs the incoming hot brewing water through the brew chamber of the filter pack.

The porosity and size of the porous area of the bottom filter medium, where adhesive is not applied, controls the discharge flow rate of the brewed coffee out of the brew chamber of the filter pack. The porosity and size of that centrally located portion of the top filter medium which is not bonded to the bottom filter medium controls the flow rate of incoming hot water into the brew chamber until such time as the brew chamber becomes flooded. The rate at which water can thereafter enter the flooded brew chamber is controlled by the discharge flow rate of brewed coffee from the brew chamber.

The individual coffee maker being used determines the total volume of finished coffee product brewed in each batch and the flow rate of water delivered to the filter pack during the brewing cycle.

In some coffee makers, a portion of the hot water which ends up in the finished batch is deliberately routed so as to completely bypass the filter pack. In this situation, concentrated brewing of the coffee is carried out only by that portion of the hot water which is directed through the filter pack. The concentration of the brewed coffee exiting the filter pack is then diluted to the level desired by the consumer by the hot water which bypassed the filter pack when the coffee exiting the brew chamber is collected in the pot located beneath the filter support means. Systems of the aforementioned type are typically employed to reduce the overall cycle time required to brew a pot of coffee.

While the particular volume of the coffee batch to be brewed and the flow rate of the incoming hot water into the filter pack may vary somewhat from one machine manufacturer to another, thereby slightly altering the absolute brew strength of the coffee produced when one manufacturer's coffee maker is compared to another, for any given coffee maker coffee filter packs of the present invention will produce comparable extraction efficiencies when compared to bulk coffee/paper filter systems using identical brewing conditions and improved pot-to-pot brew strength consistency when compared to conventional coffee filter packs of the prior art.

DETAILED DESCRIPTION OF THE INVENTION

Figure 1:
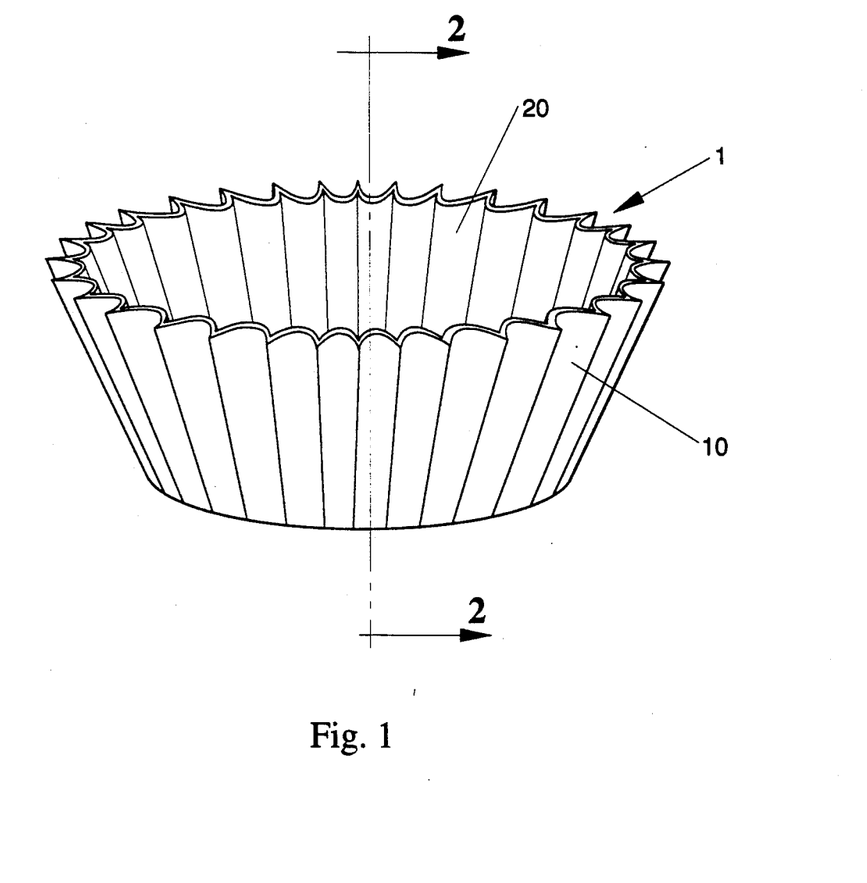
FIG. 1 is a simplified perspective view of a coffee filter pack of the present invention.

FIG. 1 shows a preferred coffee filter pack 1 of the present invention. The preferred embodiment can best be described by looking at FIG. 2 which is a simplified cross-sectional view taken along section line 2—2 of FIG. 1. The coffee filter pack comprises a bottom layer 10 comprised of a flexible porous material and a top layer 20 also comprised of flexible porous material. The inner face 11 of bottom layer 10 is preferably joined to the inner face 21 of top layer 20 about its perimeter by a hydrophobic adhesive coating 30. The hydrophobic adhesive coating makes the porous layers substantially impervious to water wherever it is applied.

Figure 2:
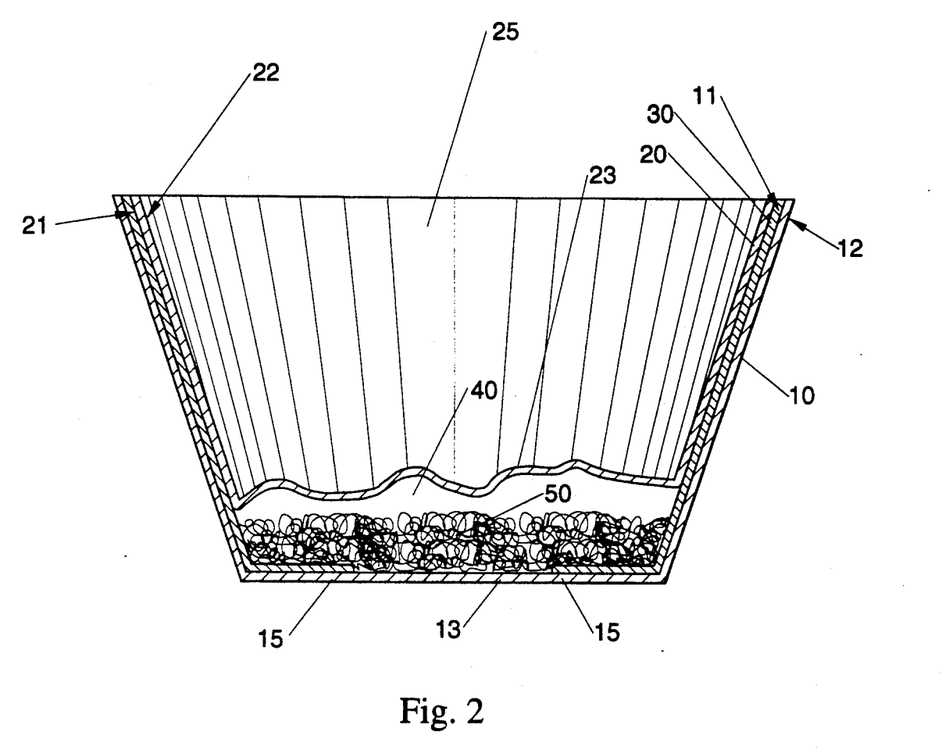
FIG. 2 is a simplified, cross-sectional view taken along section line 2—2 of FIG. 1.

The combination of bottom layer 10 and hydrophobic adhesive 30 creates a flexible and conformable side wall 25 which is substantially impervious to water. Because the combination of bottom layer 10 and hydrophobic adhesive coating 30 together form a substantially water impermeable side wall, top layer 20 need not extend all the way to the outer perimeter of bottom layer 10 to render side wall 25 substantially impermeable to water. Alternatively, the bottom layer 10 could be smaller and the top layer 20 could be rendered water impermeable by coating its outer perimeter with a hydrophobic adhesive 30. Hydrophobic adhesive coating 30 is extended along the inner face 11 of bottom layer 10 to form an annular ring 15 which coincides with the interior of brew chamber 40, leaving an uncoated permeable circular area 13 at the center of bottom layer 10. The distance to which annular ring 15 extends into brew chamber 40 controls the permeable area 13 and hence the discharge flow rate at which brewed coffee is allowed to pass through the bottom layer 10. The water flow rate into brew chamber 40 is controlled by the area of the unsecured central portion 23 of top layer 20. Assuming layers 10 and 20 are comprised of similar material, controlling the size of the permeable areas on the top and bottom layers for a given porosity controls the relative flow rates of liquids through the layers.

The flow rates of liquids through the layers and the height of the substantially vertically extending moisture impervious side wall 25 are sized and configured so that a steady state brewing condition is established within brew chamber 40 during a substantial portion of the brewing cycle. As used herein, a steady state brewing condition is established within brew chamber 40 when the brew chamber's maximum volume $V_3$ is filled with water and roast and ground coffee 50, allowing the coffee to expand and loosely float within the chamber. This condition is illustrated in the cross-section of FIG. 2A.

Figure 2A:
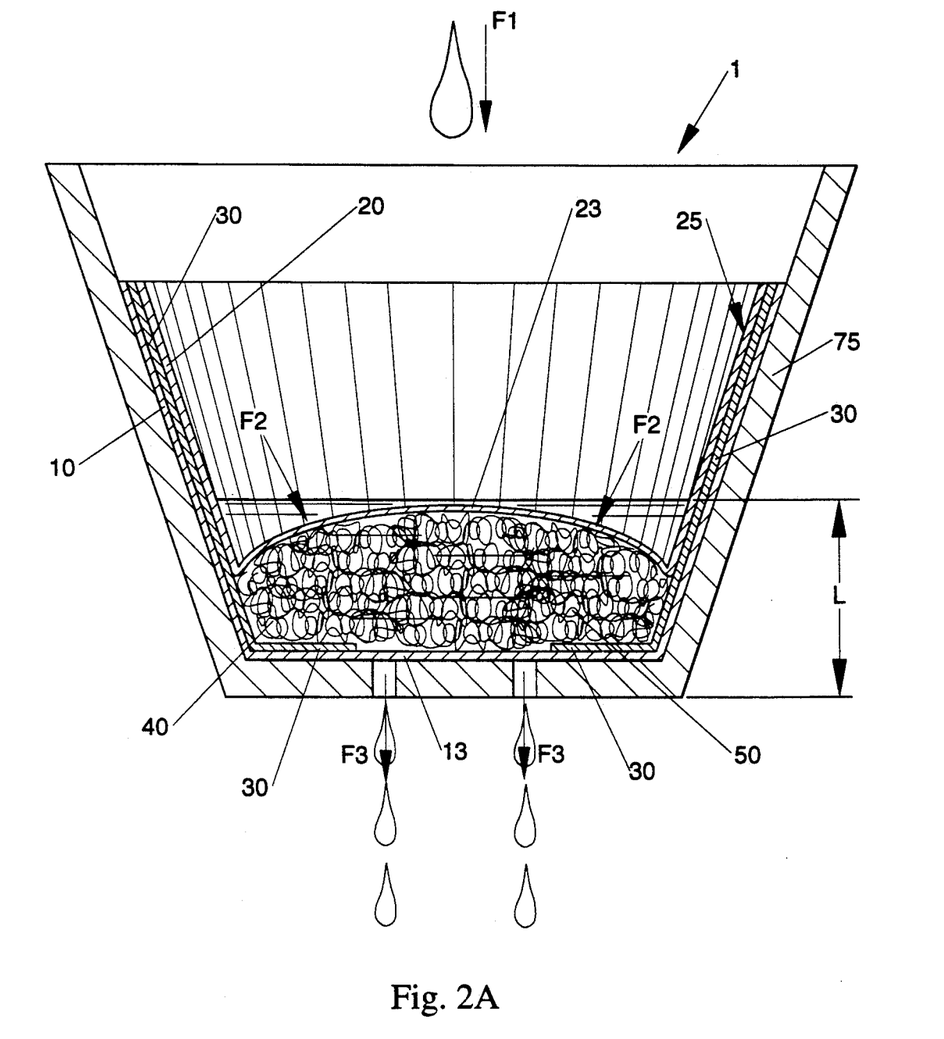
FIG. 2A is a simplified, cross-sectional view similar to that of FIG. 2, but showing the filter pack in the filter support means of a coffee maker, said view showing the brew chamber of the filter pack in a fully expanded, steady state brewing condition.

During build up to this steady state brewing condition, the flow rate $F_2$ of incoming hot water through the permeable region 23 of the top layer 20 should be greater than the maximum flow rate $F_3$ of brewed coffee exiting through the permeable area 13 in bottom layer 10. Furthermore, the water delivery flow rate $F_1$ of the coffee maker to the filter pack 1 should be less than or equal to the incoming hot water flow rate $F_2$ into brew chamber 40. Once a steady state brewing condition is reached and water has built up to the level "L" in the filter pack, as shown in FIG. 2A, flow rate $F_2$ will take on the value of flow rate $F_3$, which should still be less than flow rate $F_1$. As can be seen from FIG. 2A, substantially water impermeable side wall 25 must be at least tall enough to capture enough of the incoming hot water that the brew chamber 40 will become flooded and fully expanded to achieve a steady state brewing condition. In the embodiment shown in FIG. 2A, this minimum vertical side wall height corresponds to level "L", which represents the maximum possible vertical expansion of porous area 23 in brew chamber 40.

The higher the substantially water impermeable side wall 25 extends above this minimum, the greater will be the filter pack's insensitivity to careless placement within the filter support means 75, since lack of perfect concentricity with the filter support means will not result in an inability to retain enough hot water to establish a flooded steady state brewing condition within the brew chamber.

As a practical matter, the vertical height of the substantially water impermeable side wall 25 is greater than the foregoing minimum to prevent overflow of the incoming hot water from the coffee maker (recall that the discharge flow rate of brewed coffee from the brew chamber is normally less than the incoming flow rate of hot water to the filter pack to permit flooding of the brew chamber).

The maximum height of the substantially water impermeable side wall 25 is, of course, limited by the vertical height of the filter support means 75 used on the coffee makers which are to employ the filter packs in question. If the filter pack extends vertically beyond the uppermost edge of the filter support means 75, it is likely to cause interference when attaching the filter support means to the coffee maker.

Applicant has learned that the difference between the inlet flow rate $F_2$ of the incoming hot water and the maximum outlet flow rate of brewed coffee $F_3$ should be sufficiently great that steady state brewing condition, as shown in FIG. 2A, is reached within the brew chamber 40 relatively early in the brewing cycle. Most preferably this condition is established before more than about 50 percent of the total volume $V_2$ of water to be passed from the coffee maker through the filter pack 1 has passed through the discharge outlet 13 in the bottom layer 10. Meeting this condition helps ensure that filter packs of the present invention will consistently extract about the same level of flavor solids from a predetermined volume $V_1$ of roast and ground coffee 50 as could be extracted from an identical volume $V_1$ of identical bulk roast and ground coffee brewed under identical conditions, but using a porous paper filter containing the bulk coffee in an unconstrained condition. Thus, unlike prior art coffee filter packs, coffee filter packs of the present invention deliver comparable brewing efficiency to bulk coffee/filter paper systems, but without the need for unitized pouches of premeasured coffee to ensure pot-to-pot brew strength consistency and without the mess associated with bulk coffee and paper filters.

Figure 3:
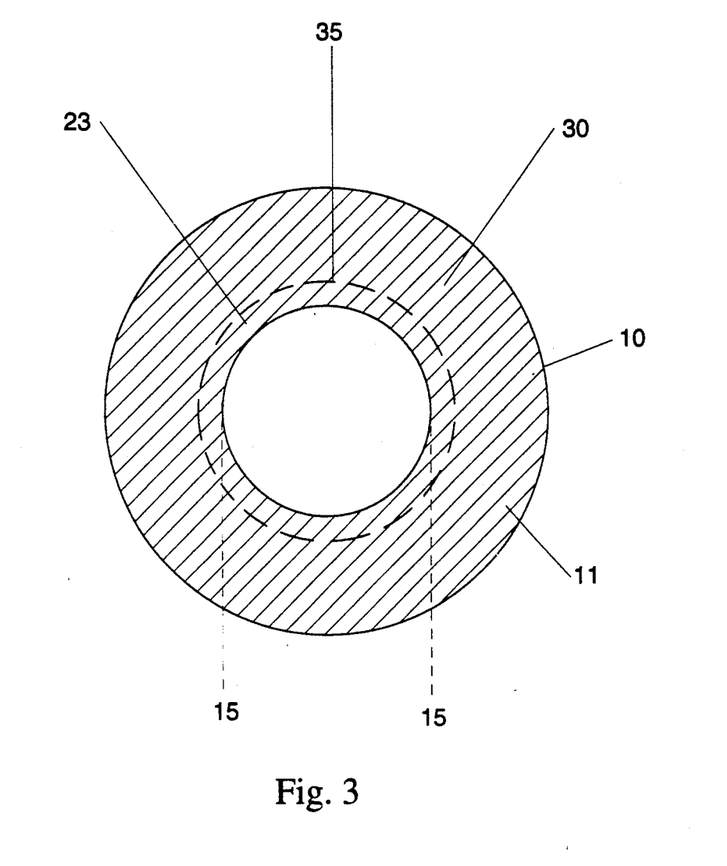
FIG. 3 is a flattened planar view of bottom layer 10 of the filter pack shown in FIG. 1.

As shown in FIG. 3, hydrophobic adhesive coating 30, which is preferably a hot melt, is applied in a ring like fashion around the perimeter of the inner face 11 of bottom layer 10, leaving an uncoated porous discharge outlet orifice 13 at the center of bottom layer 10. A predetermined amount of coffee 50 having a dry volume $V_1$ is placed within the area defined by dotted line 35 either before or at the same time as top layer 20 is superposed on bottom layer 10. Top layer 20 is then brought into contact with bottom layer 10 and heat and pressure are applied to only the outer perimeter of top layer 20, i.e., the area which lies outside dotted line 35 in FIG. 3. This adheres the outer perimeter of top layer 20 to the outer perimeter of bottom layer 10. Accordingly, dotted line 35 shows the innermost point where the top layer 20 ceases to be adhered to bottom layer 10 and defines the inlet permeable inlet orifice 23 for entry of the incoming hot water into brew chamber 40. Dotted line 35 also defines the outermost circumference of brew chamber 40.

As can be discerned from FIG. 3, the surface area of the inlet orifice 23 to the brew chamber 40 is larger than the surface area of the discharge outlet orifice 13 out of the brew chamber. For any given porosity of the top and bottom layers this will make the flow rate into the chamber greater than the maximum flow rate out of the chamber during build-up to a steady state brewing condition. This difference in flow rates in combination with the impermeable side walls of the filter pack 1 causes the incoming hot water to build up and puddle inside the brew chamber 40 in the manner generally shown in FIG. 2A. This permits the coffee/water exposure and contact time needed to obtain a desired brew strength for a predetermined amount of coffee. Also, allowing water to build up causes the particles of coffee 50 to loosely float and expand inside the brew chamber 40. This minimizes channeling of the hot water directly through the chamber without sufficient coffee contact, thereby increasing the efficiency of coffee flavor solids extraction and reducing extraction variability from pot-to-pot.

Besides having sufficient coffee/water contact time, Applicant has learned that sufficient coffee/water contact area must be provided in order for a predetermined amount of coffee to consistently produce a desired brew strength, i.e., the coffee must not be tightly constrained or it cannot float and establish a steady state brewing condition. Brew chamber 40 should be large enough to encase the desired amount of coffee 50 and to allow the coffee to expand and loosely float when the chamber is flooded, i.e., during steady state brewing conditions, as generally shown in FIG. 2A. Ideally the maximum volume $V_3$ of brew chamber 40 is between about 25 percent and about 300% larger than the dry coffee volume $V_1$. This condition is illustrated in the cross-section of FIG. 2.

The filter pack 1 preferably exhibits a frusto-conical shape, as generally shown in FIG. 1, so that even if the operator is careless in installing it in the filter support means or holder 75, the filter pack's shape and the conformability of its side wall 25 will tend to automatically self align the filter pack to produce a situation similar to that shown in FIG. 2A, so that the desired funnel effect takes place during the brew cycle.

Figure 4A:
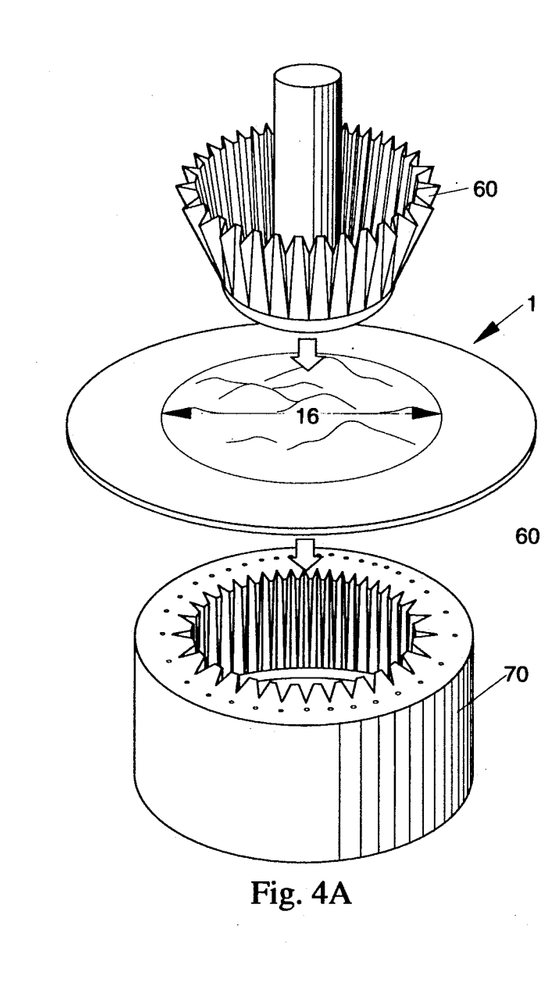
FIG. 4A is a simplified perspective view of male die 60, female die 70, and a flat coffee filter pack of the type shown in FIG. 1 prior to closure of the dies upon one another.
Figure 4B:
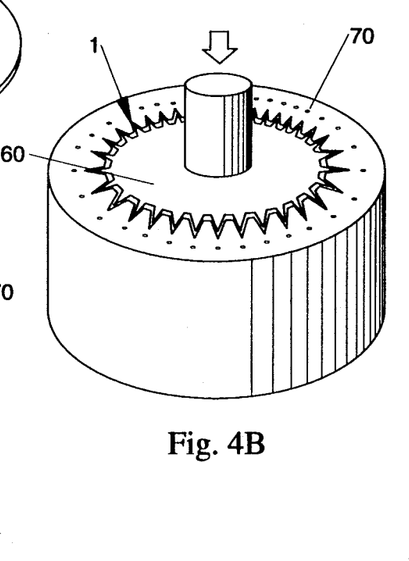
FIG. 4B is a simplified perspective view of the male and female dies of FIG. 4A in their closed position with the coffee filter pack shown in FIG. 4A between them.
Figure 4C:
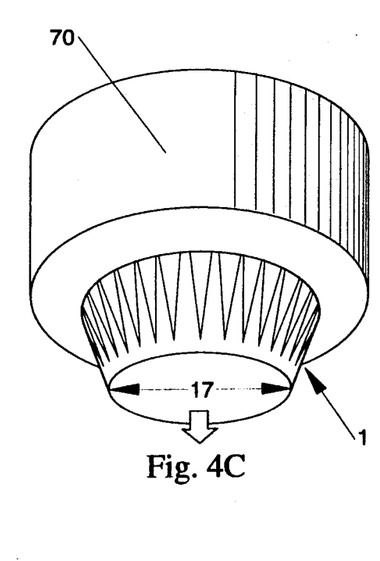
FIG. 4C shows the formed coffee filter pack of FIG. 1 as it is emerging from the female die shown in FIGS. 4A and 4B.

The process of imparting the frusto-conical shape can best be explained by looking at FIGS. 4A, 4B and 4C. A fully assembled planar filter pack 1 is placed between female die 70 and male die 60 so as to take on the desired shape as shown in FIG. 1. The unformed diameter 16 shown in FIG. 4A is larger than the formed diameter 17 shown in FIG. 4C. As can be seen from FIG. 2A, the formed diameter 17 is ideally the same diameter as the bottom of the coffee filter holder 75 of the coffee maker.

The foregoing forming process causes the unadhered porous inlet portion 23 of top layer 20, to puff up and create a large enough brew chamber 40 to achieve good coffee extraction, as shown in FIGS. 2 and 2A. While the substantially water impermeable conformable side wall 25 ensures that the hot water needed for flooding of the brew chamber will be available no matter how sloppily the filter pack 1 is placed in the filter holder 75. Thus, unlike filter packs of the prior art, the present invention is relatively insensitive to operator error.

The bottom and top layers used in filter packs of the present invention can be comprised of any paper, synthetic non-woven, or plastic material that has a porosity and mesh size capable of preventing substantially all of the coffee particles from entering into the brewed coffee beverage or sifting out while handling the disposable filter pack before or after brewing.

In a particularly preferred embodiment, both layers are comprised of filter paper comprised substantially entirely of wood fiber. This is the type of filter paper normally used to make conventional coffee filters.

The adhesive used to seal and secure the inner and outer layers to one another is preferably comprised of a hydrophobic hot melt material applied as a continuous layer, e.g., a polymeric material, such as polypropylene, applied with a rotogravure, screen, or spray coating system. The particular hydrophobic adhesive material employed should, of course, be approved for direct contact with food and beverage substances and boiling water. The adhesive ideally has a viscosity of between about 500 and about 15,000 CPS at 350° F. for coating application purposes. The adhesive should also have a softening temperature greater than 180° F. in order that the seal between the filter mediums employed in the filter pack 1 does not fail in hot water during brewing. The thickness of the hydrophobic adhesive can be adjusted, as desired, to provide the desired seal strength and degree of water imperviousness. The thickness of the adhesive can also be varied within the different portions of the filter pack to achieve different objectives. For instance, a thickness of 0.5 mils of adhesive may be sufficient to render the conformable side wall 25 of the filter pack substantially impervious to liquid, while a 1 mil thickness of adhesive may be needed to create sufficient seal strength.

In yet another embodiment of the present invention, a die cut layer of polymeric material, such as polyethylene could be substituted for layer of hydrophobic adhesive 30. This causes the filter pack to be substantially impermeable to water wherever the polyethylene is present. The three layers of the resultant laminate could, of course, be adhered to one another by applying sufficient heat to soften the polyethylene. The resultant laminate coffee filter pack would behave identically to the embodiment shown in FIGS. 1 and 2.

In still another embodiment of the present invention, the flow rates $F_2$ and $F_3$ through brew chamber 40 could be controlled by making the porous portion 13 of bottom layer 10 less porous than the porous portion 23 of top layer 20. This is usually achieved by making the bottom layer 10 slightly thicker than the top layer 20. In an embodiment of the latter type, the hydrophobic adhesive 30 would not need to extend inwardly beyond dotted line 35 in FIG. 3, since the difference in porosity of the layers would produce a difference in flow rates even if their respective areas were identical in size.

In yet another embodiment of the present invention the layers 10 and 20 could be comprised of a synthetic non-woven material containing hundreds of tiny plastic fibers packed close enough together to prevent ground coffee particles from entering the brewed beverage or escaping from the brew chamber, while still allowing water to pass therethrough. Materials of the latter type can be rendered impervious in selected regions by selectively applying heat and pressure to melt the discrete fibers together, thereby creating a thin film of plastic that is substantially water impervious. Heat and pressure could be used to adhere the two layers employed to construct the coffee filter pack to one another in the same areas shown in FIGS. 1, 2 and 3.

In still another embodiment of the present invention, the layers of the filter pack can be comprised of a continuous film of plastic or polymeric material, such as polyethylene, that is initially water impermeable. Water permeable regions can then be made by puncturing the plastic material and making hole sizes which are large enough to let water pass yet small enough to prevent the passage of substantially all of the solid coffee particles in the brewing chamber. This puncturing could, if desired, be done by a water jet process of the type generally described in commonly assigned U.S. Pat. Nos. 4,695,422 issued to Curro et al. on Sep. 22, 1987 and 4,609,518 issued to Curro et al. on Sep. 2, 1986 both disclosures of which are hereby incorporated herein by reference. Alternatively, a mechanical punching process could be employed to perforate the film. Other suitable perforated films are commercially available from Tredegar Industries, Film products Division, Terra Haute, Ind.

The size and number of holes could be varied to control flow rates through the filter pack. For example, more holes could be provided on the top layer than on the bottom layer so as to make the bottom layer less porous. Furthermore, the holes could be of identical size and density in both layers and the flow areas adjusted in the same manner shown in FIGS. 1, 2 and 3 so as to control liquid flow rates it-,to and out of the brew chamber in a similar fashion. That is the size of the porous inlet orifice and porous outlet orifices could be varied. No holes would be placed in the side wall portion of the filter pack so as to keep them substantially impermeable to water.

Many of the plastic sheets described above are made in rolls or sheets of plastic film that are apertured or water permeable continuously throughout. Therefore, in order to make the filter pack of the present invention with continuously apertured film, the top and bottom layers should be secured together and made impermeable around the region corresponding to the side wall 25. This could be accomplished by applying heat and pressure to this region to form an impermeable side wall. Any sealing process could be used that causes the two layers of plastic material to bond together. The seal ing should cause the plastic to melt and flow back together, thereby closing substantially all of the holes therein. If the top and bottom layers are made from identical sheets of plastic material having the same size holes and density of holes the flow rates could be adjusted by applying heat and pressure to the bottom layer to close up some of the holes. This reduces the size of the outlet orifice and thereby reduces the flow rate therethrough.

It has been found that for the plastic films described above, a hole size ranging from 4 mils to 10 mils is ideal for retaining dry coffee sediment in the brewing chamber. Approximately 40–100 holes, regularly arrayed and spaced, for this size range per square inch of material is ideal for obtaining the good water flow characteristics. In addition, surfactants can be applied to the plastic films to aid in water flow. The surfactants can be applied to the surface or incorporated within the material. Suitable surfactants for application on the films surface would include polysorbates, polyglycerol esters and monoglyceride derivatives.

Figure 5:
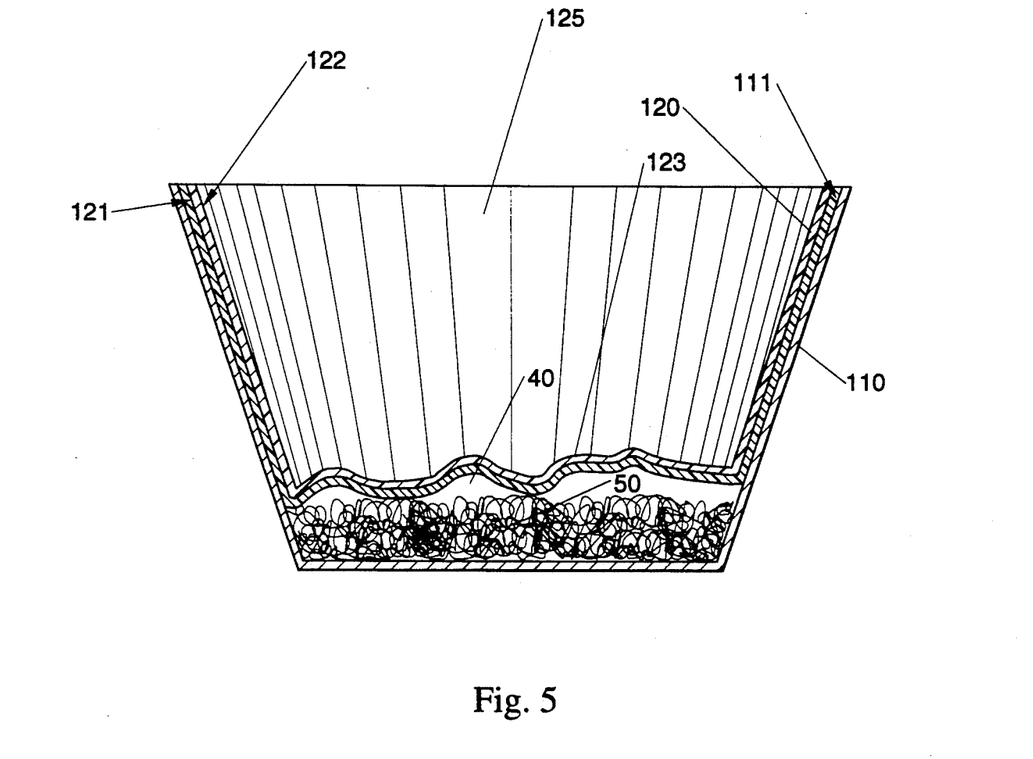
FIG. 5 is a simplified cross-sectional view similar to that of FIG. 2 showing an alternative embodiment of the present invention.

Still yet another embodiment of the present invention is shown in FIG. 5. FIG. 5 is a simplified cross-sectional view of coffee filter pack 101 of the present invention. Coffee filter pack 101 comprises bottom layer 110 made from porous filter paper, and top layer 120 made from a continuous film of plastic material, such as those described above. When sealing a continuously porous layer of coextruded plastic film to porous filter paper, it is preferred that most of the heat come from the paper side. This allows the sealant side of the film to flow into the paper creating a stronger bond, and aiding in closing the holes in the film.

It is preferred that when using a plastic film to make either or both layers of the coffee filter pack that the plastic material used be a two layer co-extruded plastic film wherein the sealant side of the film, the layer that is to be sealed to another layer, has a lower melting temperature than the outside surface in order to aid in sealing. FIG. 5 shows the top layer 120 as being a co-extruded plastic film. Top layer 120 comprises two sub-layers 121 and 122. It is preferred that sub-layer 121 have a lower melting temperature than sub-layer 122. This difference in temperatures allows for higher sealing temperatures to be used while preventing the non-sealant side of plastic material from sticking to the sealing surface. Typical materials for sublayer 122 include polyolefins whereas typical materials for sub-layer 121 also include polyolefins but containing EVA's therein.

In a particularly preferred embodiment of the present invention the water permeable region 13 of the bottom layer in the brewing chamber 40 is generally located in the center of the brew chamber where the coffee is placed. A single continuous permeable area 13 is also generally preferred over a multiplicity of discrete porous areas to maximize consistent extraction of flavor solids from the roast and ground coffee 50 contained within the brew chamber 40.

EXEMPLARY EMBODIMENT OF THE PRESENT INVENTION

A filter pack of the type generally shown in FIGS. 1, 2 and 3 was constructed using a generally circular shaped piece of James River 20 lb/3000 ft² basis weight porous filter paper having a 9.5 inch diameter as the bottom layer. National Starch & Chemical's 6931-107-1 hydrophobic adhesive was pattern coated on the bottom layer in the pattern generally shown in FIG. 3 using a Graco Microprint screen coater and leaving an uncoated circular central area having a 4.625 inch diameter at the center of the bottom layer to act as the discharge flow outlet 13 for brewed coffee. A dose of 43.4 grams of 8 mil flaked roast and ground coffee containing approximately 4.5 percent moisture by weight and having a dry volume of approximately 8.3 cubic inches was placed in the center of the uncoated portion of the bottom layer.

A generally circular shaped piece of James River 20 lb/3000 ft² basis weight porous filter paper with a 7 inch diameter was employed for the top layer. The top layer was concentrically centered with and heat sealed to the bottom layer to encapsulate the roast and ground coffee. The width of the seal extended radially inwardly from the outer perimeter of the top layer for a distance of ½ inch. This resulted in a porous inlet area 23 to the brew chamber having a diameter of approximately 6 inches.

The porosity of the filter paper used to make the top and bottom layers was approximately 300 milliliters of water/minute/in². Since the area of the inlet was 28.3 in², the maximum possible flow rate $F_2$ of hot water into the brew chamber was approximately 8.5 liters/minute. This flow rate is much greater than the flow rate $F_1$ at which most coffee makers deliver hot water to the filter pack. Therefore the actual flow rate $F_2$ will, in most instances, be equal to the flow rate $F_1$ delivered by the coffee maker to the coffee filter pack prior to establishing a steady state brewing condition in the brew chamber. Once a steady state brewing condition has been established within the brew chamber, flow rate $F_2$ will be substantially equal to the discharge flow rate $F_3$ of brewed coffee exiting the brew chamber.

Next, the filter pack was formed, as generally shown in FIGS. 4A, 4B, and 4C to take on the desired frusto-conical shape and a bottom diameter of approximately 4.5 inches. The forming process used male and female dies, as generally shown in FIGS. 4A–4C. The filter pack was first centered over the female die 70. The male die 60 was then forced down into the female die, forming and folding the filter pack in such a way that it was sandwiched between the male and female dies. Hot air at 200° F. was blown onto the filter pack side wall 25 to soften the hydrophobic adhesive 30. The filter pack was then cooled for 5 to 10 seconds to allow the adhesive to set to the frusto-conical shape and removed by lifting up the male die 60 and shoving the filter pack through the bottom of the female die FIG. 4C. The forming process caused the unsecured porous portion 23 of the top filter medium to "puff up" creating a maximum brew chamber volume of approximately 22 cubic inches (frusto-conical volume 4.5" bottom diameter, 5" top diameter, 1.25" tall). This volume $V_3$ is approximately 165% greater than the volume $V_1$ of the dry roast and ground coffee contained therein.

Thirty nine exemplary coffee filter packs of the aforementioned type were brewed by four different cafeteria workers using a Bunn OL20 coffee maker having a porous filter support with a bottom diameter of approximately 4.5 inches. The coffee maker delivered approximately 1,870 milliliters of water at 195° F. in approximately 2.5 minutes, thereby resulting in an incoming hot water delivery rate $F_1$ of approximately 748 milliliters/minute. The brew chamber of the filter pack was flooded and a steady state brewing condition established therein within the first 30 seconds of the brewing cycle. This occurred by the time no more than 20 percent of the total predetermined volume $V_2$ of water delivered to the filter pack had passed through the brew chamber.

The average flow rate $F_3$ of brewed coffee out of the brew chamber ranged from about 368 to about 425 milliliters/minute, never exceeding flow rates $F_1$ or $F_2$.

Samples of the final beverage were taken from all 39 pots of coffee brewed. The amount of extractable flavor solids in each sample was measured by weighing the coffee flavor solids remaining after evaporating the water in the samples.

Out of the 39 pots, the extraction efficiency levels averaged 0.315 grams of extracted coffee flavor solids/gram of dry coffee. The standard deviation for the 39 samples was 0.0074 grams of extracted coffee flavor solids/gram of dry coffee.

IDENTICAL QUANTITY OF BULK COFFEE BREWED UNDER IDENTICAL CONDITIONS USING A POROUS PAPER FILTER

In a second separate experiment, 43.4 grams of the same loose coffee used in the foregoing exemplary embodiment of the present invention were placed in a separate open and unconstrained filter. The coffee filter was purchased from the Bunn Corporation (Springfield, Illinois) and was reportedly made from James River 20 lb/3000 ft² porous paper shaped to fit the coffee filter holder of a Bunn OL20 coffee brewer (frusto-conical shape 4.5" bottom dia., 6" top dia., 2.625" height). The Bunn coffee filter with the coffee in the bottom was then placed in the same filter holders and Bunn OL20 brewers used to test the exemplary embodiment of the present invention. Thirty five replicates were brewed by four different cafeteria workers. The average flow rate out of the filter holder ranged from about 420 to about 475 milliliters/minute.

Out of the thirty-five pots, the extraction efficiency was determined using the same method described above. It averaged 0.306 grams of extracted coffee flavor solids/gram of dry coffee with a standard deviation for the 35 samples of 0.0121 grams of extracted coffee flavor solids/gram of dry coffee.

FILTER PACK OF CONVENTIONAL PRIOR ART CONFIGURATION EMPLOYING IDENTICAL QUANTITY OF COFFEE

In a third separate experiment, a conventional round coffee filter pack having a design generally similar to those frequently encountered in commerce was constructed containing 43.4 grams of the same coffee used in the previous two examples. Two circles 6.75 inches in diameter were cut from a web of porous heat sealable filter paper (#3968) obtained from the Dexter Corporation, Windsor Locks, Conn. (used in making most commercial filter packs). The circles were sealed together with the heat sealable sides on the inside. The seal was made such that there was a 5.625 inch diameter unsealed area centered within the 6.75 inch diameter circles. Enclosed within the 5.625 inch diameter unsealed area was the 43.4 grams of coffee.

The product was brewed in the same Bunn OL20 coffee brewers used in the previous two examples. Thirty-nine replicates were brewed by four cafeteria workers. The average discharge flow rate out of the brewing chamber ranged between about 600 and about 690 milliliters/minute. Samples of the final beverage were taken from all 39 pots and extraction efficiencies were measured in the same manner as described previously. Out of the 39 pots, the extraction efficiency averaged 0.23 grams of extracted coffee flavor solids/gram of dry coffee with a standard deviation for the 39 samples of 0.054 grams of extracted coffee flavor solids/gram of dry coffee.

| SUMMARY OF THE FOREGOING EXEMPLARY EXTRACTION RESULTS | | | |
|---|---|---|---|
| | Present Invention | Loose Coffee in Paper Filter | Flat Filter Pack of Conventional Round Configuration |
| Extraction Efficiency grams of extracted flavor solids gram of dry coffee | 0.315 | 0.306 | 0.23 |
| Std. Dev. grams of extracted flavor solids gram of dry coffee | 0.0074 (based on 39 samples) | 0.0121 (based on 35 samples) | 0.0542 (based on 39 samples) |

The foregoing exemplary data clearly demonstrate that the extraction efficiency of the exemplary coffee filter packs of the present invention not only met, but slightly exceeded that of the bulk coffee/filter paper combination, while substantially exceeding that of the flat conventional round confirmation filter pack examples. Furthermore, the standard deviation for the exemplary filter packs of the present invention was approximately half that of the bulk coffee/filter paper combination, and only about a fifth that of the conventional round filter pack examples. As will be understood by those skilled in the art, the lower standard deviation of the exemplary coffee packs of the present invention is indicative of more consistent brew strength from pot-to-pot.

While particular embodiments of the present invention have been illustrated and described, it would be obvious to those skilled in the art that various changes and modifications can be made without departing from the spirit and scope of the present invention. For example, the post fabrication forming step could be omitted, and the filter pack could remain substantially flat until insertion into the filter support means of the coffee maker. Because the substantially water impermeable side walls are flexible, insertion of the substantially flat filter support means will cause them to conform to the filter support means and assume an upwardly directed orientation sufficient to produce the desired brewing action. It is intended to cover in the appended claims, all such modifications that are within the scope of this invention.

What is claimed is:

1. A conformable, high extraction efficiency, coffee filter pack containing a predetermined volume $V_1$ of dry roast and ground coffee having extractable flavor solids therein, said coffee filter pack being suitable for use in combination with a coffee maker having a porous means for supporting said conformable filter pack in an upwardly concave configuration and means for delivering a predetermined volume $V_2$ of hot water into said upwardly concave filter pack at a predetermined water delivery flow rate $F_1$ to produce a brewed coffee product of substantially consistent brew strength from one pot to the next, said coffee filter pack comprising:

(a) a bottom layer comprised of a flexible, porous material, said bottom layer having inner and outer faces;

(b) a top layer comprised of a flexible, porous material, said top layer having inner and outer faces, said inner face of said top layer being centered and continuously secured to said bottom layer about said top layer's outer perimeter, thereby defining a brew chamber between their centrally located non-joined areas, said brew chamber containing said predetermined volume $V_1$ of roast and ground coffee, said brew chamber having a maximum volume $V_3$ that is between about 25% and about 300% larger than the volume $V_1$ of said dry roast and ground coffee;

(c) a conformable side wall defined by the portions of said top and bottom layers extending outwardly from the outer perimeter of said brew chamber, said filter pack further including a means for making said side wall substantially impervious to the passage of water, said side wall, upon insertion into said support means in said coffee maker, being substantially vertically oriented about its entire periphery so as to retain incoming hot water from the coffee maker therein, the vertical height of said substantially water impervious vertically extending side wall being at least sufficient to retain enough incoming hot water to totally immerse said brew chamber when said brew chamber is in its flooded and fully expanded condition;

(d) a porous inlet orifice in said top layer of said brew chamber to prevent the passage of roast and ground coffee therethrough yet allow incoming hot water, which is retained by said substantially vertically oriented substantially water impervious side wall, to pass therethrough at a predetermined flow rate $F_2$ at least until a substantially steady state brewing condition is reached inside said brew chamber; and (e) a porous discharge outlet orifice in said bottom layer of said brew chamber to prevent the passage of roast and ground coffee therethrough yet allow brewed coffee to pass therethrough at a predetermined maximum outlet flow rate $F_3$ once a steady state brewing condition is reached inside said brew chamber, said porous discharge outlet orfice in said bottom layer being of lesser area than said porous outlet orifice in said top layer such that said maximum outlet flow rate $F_3$ being less than said flow rate $F_1$ of said incoming hot water from said coffee maker and less than said inlet flow rate $F_2$ into said brew chamber, the difference between said inlet flow rate $F_2$ and said outlet flow rate $F_3$ being sufficiently great that said brew chamber becomes flooded to produce a steady state brewing condition wherein the combined volume of the water and the roast and ground coffee contained in said brew chamber are substantially equal to the maximum column $V_3$ of said brew chamber before a significant portion of the total volume $V_2$ of incoming hot water has exited said brew chamber, and wherein said means for making said side wall substantially impervious to the passage of water extends onto the inner face of said bottom layer in said brew chamber so as to define the area of said discharge outlet orifice and control the maximum discharge flow rate $F_3$.

2. A coffee filter pack according to claim 1, wherein said substantially water impermeable side wall is preformed to cause said coffee filter pack to assume an upwardly concave configuration prior to insertion of said coffee filter pack into said support means on said coffee maker.

3. A coffee filter pack according to claim 1, wherein said top layer and said bottom layer are comprised of porous filter paper, and wherein said means for making said side walls substantially impervious to the passage of water comprises a hydrophobic polymeric material coated on said bottom layer in all areas other than said discharge outlet in said bottom wall of said brew chamber.

4. The coffee filter pack according to claim 3 wherein said hydrophobic polymeric material comprises a hot melt adhesive.

5. A coffee filter pack according to claim 1, wherein said means for making said side wall substantially impervious to the passage of water comprises a substantially water impermeable polymeric layer located between said top layer and said bottom layer and secured to said bottom layer, said polymeric layer including a centrally located aperture which defines said porous discharge orifice in said bottom layer of said brew chamber when said polymeric layer is secured between said top and said bottom layers.

6. A coffee filter pack according to claim 1, wherein said flow rate $F_2$ of said porous inlet orifice and said maximum flow rate $F_3$ of said porous discharge outlet orifice are so related that a steady state brewing condition is established in said brew chamber before no more than about 50 percent of said volume $V_2$ of incoming hot water has exited said brew chamber.

7. The coffee filter pack of claim 6, wherein said inlet flow rate $F_2$ of said porous inlet orifice is between about 1.5 and about 2.0 times said maximum discharge flow rate $F_3$ of said porous discharge orifice.

8. A coffee filter pack according to claim 1, wherein the vertical height of said substantially water impermeable vertically extending side wall is slightly less than the minimum vertical height of said porous filter support means on said coffee maker.

* * * * *

UNITED STATES PATENT AND TRADEMARK OFFICE
CERTIFICATE OF CORRECTION

PATENT NO. : 5,298,267

DATED : March 29, 1994

INVENTOR(S) : Dana P. Gruenbacher

It is certified that error appears in the above-identified patent and that said Letters Patent is hereby corrected as shown below:

Column 7, Line 9, after "configured" insert -- in filter packs of the present invention -- .

Column 10, Line 65, "it-,to" should read -- into -- .

Column 11, Lines 13-14, "seal i ng" should read -- sealing -- .

Column 15, Line 58, "orfice" should read -- orifice -- .

Column 15, Line 60, "outlet" should read -- inlet -- .

Column 16, Line 9, "column" should read -- volume -- .

Signed and Sealed this

Twenty-second Day of April, 1997

*Attest:*

BRUCE LEHMAN

*Commissioner of Patents and Trademarks*

*Attesting Officer*